United States Patent
Yun

(10) Patent No.: US 9,854,076 B2
(45) Date of Patent: Dec. 26, 2017

(54) MOBILE TERMINAL

(71) Applicant: LG ELECTRONICS INC., Seoul (KR)

(72) Inventor: Hyuk Yun, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 232 days.

(21) Appl. No.: 14/307,919

(22) Filed: Jun. 18, 2014

(65) Prior Publication Data

US 2015/0181005 A1  Jun. 25, 2015

(30) Foreign Application Priority Data

Dec. 24, 2013  (KR) .................. 10-2013-0162167

(51) Int. Cl.
| | |
|---|---|
| H04W 4/20 | (2009.01) |
| H04M 1/02 | (2006.01) |
| H01Q 1/24 | (2006.01) |
| H01Q 9/42 | (2006.01) |
| H01Q 21/28 | (2006.01) |

(52) U.S. Cl.
CPC ............ *H04M 1/026* (2013.01); *H01Q 1/243* (2013.01); *H01Q 9/42* (2013.01); *H01Q 21/28* (2013.01)

(58) Field of Classification Search
None
See application file for complete search history.

(56) References Cited

U.S. PATENT DOCUMENTS

| | | | | |
|---|---|---|---|---|
| 6,611,691 | B1* | 8/2003 | Zhou ................ | H01Q 1/244 343/709 |
| 6,731,920 | B1* | 5/2004 | Iwai ................. | H01Q 1/243 343/702 |
| 7,659,855 | B2* | 2/2010 | Mashima .......... | H01Q 1/243 343/702 |
| 2003/0060233 | A1* | 3/2003 | Masaki ............ | G06F 1/1616 455/558 |
| 2008/0311849 | A1* | 12/2008 | Washiro ........... | H01P 1/203 455/41.1 |
| 2010/0103054 | A1* | 4/2010 | Shi .................. | H01Q 1/44 343/702 |
| 2010/0120479 | A1* | 5/2010 | Ogatsu ............ | G06F 1/1624 455/575.4 |
| 2010/0330934 | A1* | 12/2010 | Zhang .............. | H01Q 1/22 455/90.2 |

(Continued)

*Primary Examiner* — Daniel Lai
*Assistant Examiner* — Frank Donado
(74) *Attorney, Agent, or Firm* — Ked & Associates, LLP

(57) ABSTRACT

There is disclosed a mobile terminal including a case, a first antenna mounted in the case to perform wireless communication in a specific frequency band, a grounding surface mounted in the case, a receiver mounted in the case, toward a front surface of the case, a battery cover coupled to a rear surface of the case, the battery cover comprising a conductive portion, and a contact pin configured to connect the conductive portion and the grounding surface with each other, wherein the contact pin is formed in a predetermined portion where a phase of an electromagnetic field formed by the first antenna changes. The mobile terminal may adjust the HAC grade to a base grade or higher of the HAC by adjusting the position of the electromagnetic field peak, regardless of the size of the mobile terminal.

16 Claims, 8 Drawing Sheets

(56) References Cited

U.S. PATENT DOCUMENTS

| | | | |
|---|---|---|---|
| 2011/0177849 A1* | 7/2011 | Man | H01Q 1/243 455/575.1 |
| 2011/0230146 A1* | 9/2011 | Morishita | H01Q 1/243 455/77 |
| 2012/0157171 A1* | 6/2012 | Ma | H04M 1/0277 455/575.1 |
| 2013/0078935 A1* | 3/2013 | Nysen | H01Q 21/28 455/129 |
| 2013/0090072 A1* | 4/2013 | Lim | H01Q 1/243 455/77 |
| 2015/0105128 A1* | 4/2015 | Huang | H04B 1/3888 455/575.8 |
| 2015/0256211 A1* | 9/2015 | Miyazaki | H01Q 1/243 455/575.8 |

\* cited by examiner (a)

(b)

(a)

(b)

MOBILE TERMINAL

CROSS-REFERENCE TO RELATED APPLICATION(S)

Pursuant to 35 U.S.C. §119(a), this application claims the benefit of earlier filing date and right of priority to Korean Application No. 10-2013-0162167, filed on Dec. 24, 2013, the contents of which are hereby incorporated by reference herein in their entirety.

BACKGROUND

1. Field

Embodiments of the present disclosure relates to a mobile terminal which satisfies HAC (Hearing Aid Compatibility) grade by expanding a grounding area.

2. Background

Generally, terminals can be classified into mobile terminals and stationary terminals. In addition, the mobile terminals can be further classified into handheld terminals and vehicle mount terminals.

Further, a mobile terminal can perform various functions such as data and voice communications, capturing images and video via a camera, recording audio, playing music files and outputting music via a speaker system, and displaying images and video on a display.

There are ongoing efforts to support and increase the functionality of mobile terminals. Such efforts include software and hardware improvements, as well as changes and improvements in the structural components which form the mobile terminal.

With the increase of the elderly, use of hearing aids is increasing. When a user wearing a hearing aid is talking on a mobile terminal, interference of electromagnetic fields generated in a mobile terminal and a hearing aid could cause disturb the user's talking.

BRIEF DESCRIPTION OF THE DRAWINGS

The embodiments will be described in detail with reference to the following drawings in which like reference numerals refer to like elements wherein.

DETAILED DESCRIPTION

Description will now be given in detail according to the exemplary embodiments disclosed herein, with reference to the accompanying drawings. For the sake of brief description with reference to the drawings, the same or equivalent components will be provided with the same reference numbers, and description thereof will not be repeated. A suffix "module" and "unit" used for constituent elements disclosed in the following description is merely intended for easy description of the specification, and the suffix itself does not give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that, although the terms first, second, etc. may be used herein to describe various elements, these elements should not be limited by these terms. These terms are only used to distinguish one element from another.

It will be understood that when an element is referred to as being "connected with" another element, the element can be directly connected with the other element or intervening elements may also be present. In contrast, when an element is referred to as being "directly connected with" another element, there are no intervening elements present.

A singular representation may include a plural representation as far as it represents a definitely different meaning from the context.

Terms 'include' or 'has' used herein should be understood that they are intended to indicate an existence of several components or several steps, disclosed in the specification, and it may also be understood that part of the components or steps may not be included or additional components or steps may further be included.

Mobile terminals described herein may include cellular phones, smart phones, laptop computers, digital broadcasting terminals, personal digital assistants (PDAs), portable multimedia players (PMPs), navigators, slate PCs, tablet PCs, ultra books, wearable devices (for example, smart watches, smart glasses, head mounted displays (HMDs)), and the like.

However, it may be easily understood by those skilled in the art that the configuration according to the exemplary embodiments of this specification can also be applied to stationary terminals such as digital TV, desktop computers and the like, excluding a case of being applicable only to the mobile terminals.

Figure 1A:
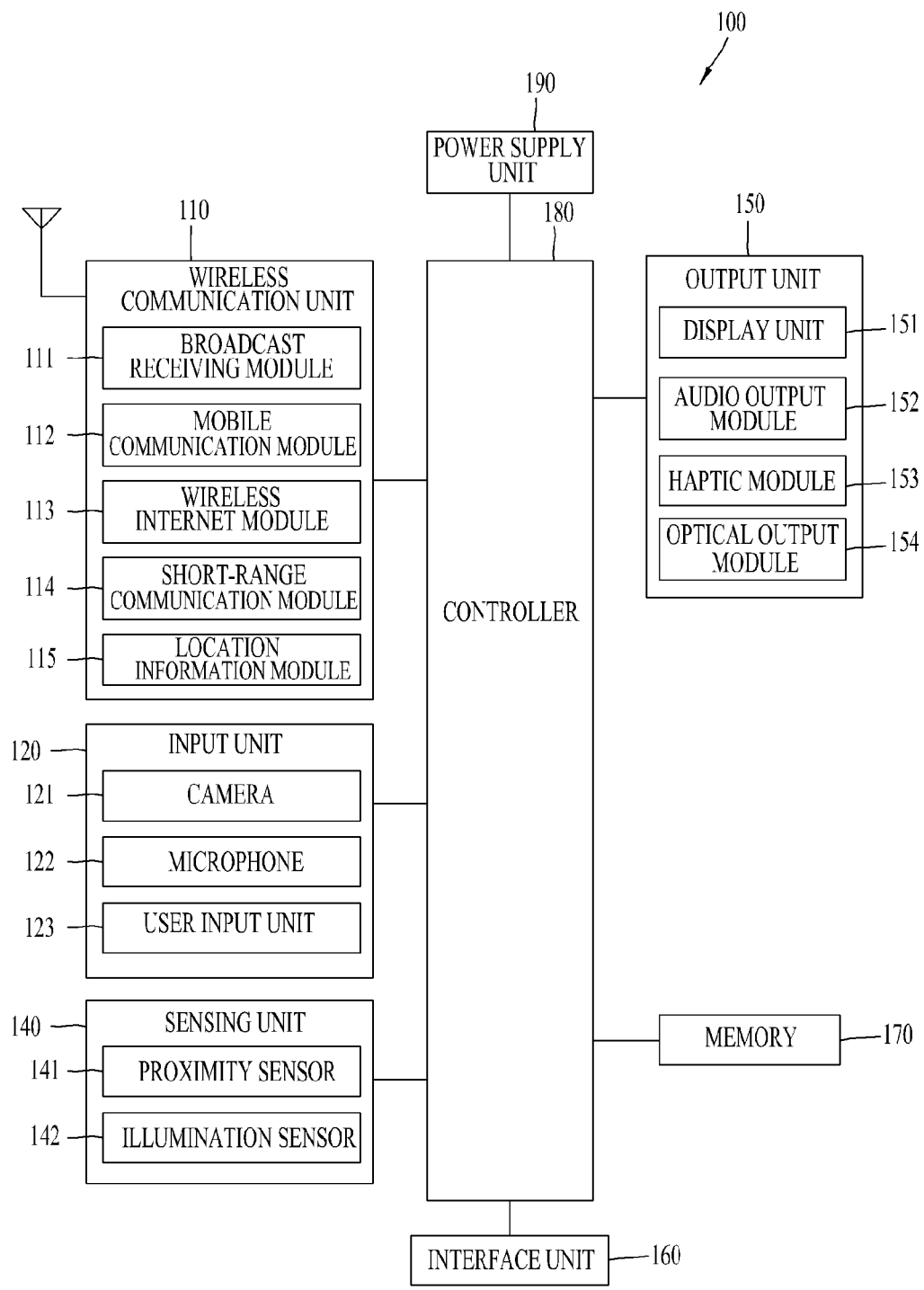
FIG. 1A is a block diagram of a mobile terminal in accordance with the present disclosure.
Figure 1B:
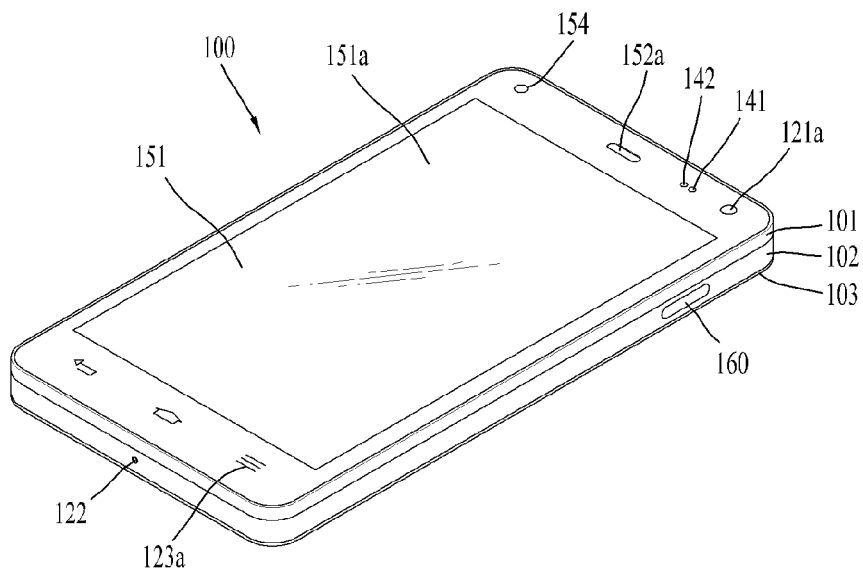
FIGS. 1B and 1C are conceptual views of one example of the mobile terminal, viewed from different directions.
Figure 1C:
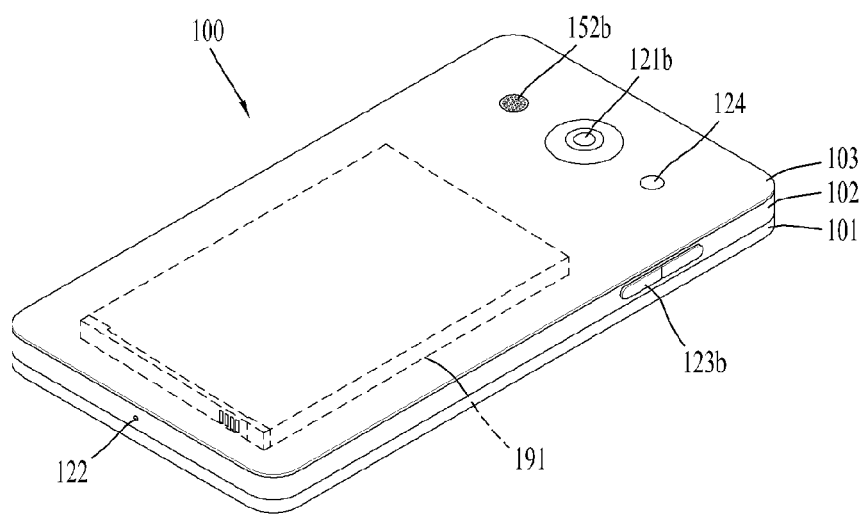

FIG. 1A is a block diagram of a mobile terminal in accordance with the present disclosure and FIGS. 1B and 1C are conceptual views of one example of the mobile terminal, viewed from different directions.

The mobile terminal 100 may include components, such as a wireless communication unit 110, an input unit 120, a sensing unit 140, an output unit 150, an interface unit 160, a memory 170, a controller 180, a power supply unit 190 and the like. FIG. 1A illustrates the mobile terminal having various components, but it may be understood that implementing all of the illustrated components is not a requirement. Greater or fewer components may alternatively be implemented.

In more detail, the wireless communication unit 110 of those components may typically include one or more modules which permit wireless communications between the mobile terminal 100 and a wireless communication system, between the mobile terminal 100 and another mobile terminal 100, or between the mobile terminal 100 and a network within which another mobile terminal 100 (or an external server) is located.

For example, the wireless communication unit 110 may include at least one of a broadcast receiving module 111, a mobile communication module 112, a wireless Internet module 113, a short-range communication module 114, a location information module 115 and the like.

The input unit 120 may include a camera 121 for inputting an image signal, a microphone 122 or an audio input module for inputting an audio signal, or a user input unit 123 (for example, a touch key, a push key, (a mechanical key, etc.) for allowing a user to input information. Audio data or image data collected by the input unit 120 may be analyzed and processed by a user's control command.

The sensing unit 140 may include at least one sensor which senses at least one of internal information of the mobile terminal, a surrounding environment of the mobile terminal and user information. For example, the sensing unit 140 may include a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, refer to the camera 121), a microphone 122, a battery gage, an environment sensor (for example, a barometer, a hygrometer, a thermometer, a radiation detection sensor, a thermal sensor, a gas sensor, etc.), and a chemical sensor (for example, an electronic nose, a health care sensor, a biometric sensor, etc.). On the other hand, the mobile terminal disclosed herein may utilize information in such a manner of combining information sensed by at least two sensors of those sensors.

The output unit 150 may be configured to output an audio signal, a video signal or a tactile signal. The output unit 150 may include a display unit 151, an audio output module 152, a haptic module 153, an optical output module 154 and the like. The display unit 151 may have an inter-layered structure or an integrated structure with a touch sensor so as to implement a touch screen. The touch screen may provide an output interface between the mobile terminal 100 and a user, as well as functioning as the user input unit 123 which provides an input interface between the mobile terminal 100 and the user.

The interface unit 160 may serve as an interface with various types of external devices connected with the mobile terminal 100. The interface unit 160, for example, may include wired or wireless headset ports, external power supply ports, wired or wireless data ports, memory card ports, ports for connecting a device having an identification module, audio input/output (I/O) ports, video I/O ports, earphone ports, or the like. The mobile terminal 100 may execute an appropriate control associated with a connected external device, in response to the external device being connected to the interface unit 160.

The memory 170 may store a plurality of application programs (or applications) executed in the mobile terminal 100, data for operations of the mobile terminal 100, instruction words, and the like. At least some of those application programs may be downloaded from an external server via wireless communication. Some others of those application programs may be installed within the mobile terminal 100 at the time of being shipped for basic functions of the mobile terminal 100 (for example, receiving a call, placing a call, receiving a message, sending a message, etc.). On the other hand, the application programs may be stored in the memory 170, installed in the mobile terminal 100, and executed by the controller 180 to perform an operation (or a function) of the mobile terminal 100.

The controller 180 may typically control an overall operation of the mobile terminal 100 in addition to the operations associated with the application programs. The controller 180 may provide or process information or functions appropriate for a user in a manner of processing signals, data, information and the like, which are input or output by the aforementioned components, or activating the application programs stored in the memory 170.

The controller 180 may control at least part of the components illustrated in FIG. 1, in order to drive the application programs stored in the memory 170. In addition, the controller 180 may drive the application programs by combining at least two of the components included in the mobile terminal 100 for operation.

The power supply unit 190 may receive external power or internal power and supply appropriate power required for operating respective elements and components included in the mobile terminal 100 under the control of the controller 180. The power supply unit 190 may include a battery, and the battery may be configured to be embedded in the terminal body, or configured to be detachable from the terminal body.

At least part of those elements and components may be combined to implement operation and control of the mobile terminal or a control method of the mobile terminal according to various exemplary embodiments described herein. Also, the operation and control or the control method of the mobile terminal may be implemented in the mobile terminal in such a manner of activating at least one application program stored in the memory 170.

Referring to FIGS. 1B and 1C, the mobile terminal 100 disclosed herein may be provided with a bar-type terminal body. However, the present disclosure may not be limited to this, but also may be applicable to various structures such as watch type, clip type, glasses type or folder type, flip type, slide type, swing type, swivel type, or the like, in which two and more bodies are combined with each other in a relatively movable manner. Here, the terminal body may be understood as a conception which indicates the mobile terminal 100 as at least one assembly.

The mobile terminal 100 may include a case (casing, housing, cover, etc.) forming the appearance of the terminal. In this embodiment, the case may be divided into a front case 101 and a rear case 102. Various electronic components may be incorporated into a space formed between the front case 101 and the rear case 102. At least one middle case may be additionally disposed between the front case 101 and the rear case 102.

A display unit 151 may be disposed on a front surface of the terminal body to output information. As illustrated, a window 151a of the display unit 151 may be mounted to the front case 101 so as to form the front surface of the terminal body together with the front case 101.

In some cases, electronic components may also be mounted to the rear case 102. Examples of those electronic components mounted to the rear case 102 may include a detachable battery 191, an identification module, a memory card and the like. Here, a rear cover 103 for covering the electronic components mounted may be detachably coupled to the rear case 102. Therefore, when the rear cover 103 is detached from the rear case 102, the electronic components mounted to the rear case 102 may be externally exposed.

As illustrated, when the rear cover 103 is coupled to the rear case 102, a side surface of the rear case 102 may be partially exposed. In some cases, upon the coupling, the rear case 102 may also be completely shielded by the rear cover 103. On the other hand, the rear cover 103 may include an opening for externally exposing a camera 121b or an audio output module 152b. The cases 101, 102, 103 may be formed by injection-molding synthetic resin or may be formed of a metal, for example, stainless steel (STS), aluminum (Al), titanium (Ti), or the like.

Unlike the example which the plurality of cases form an inner space for accommodating such various components, the mobile terminal 100 may be configured such that one case forms the inner space. In this example, a mobile terminal 100 having a uni-body formed in such a manner that synthetic resin or metal extends from a side surface to a rear surface may also be implemented.

On the other hand, the mobile terminal 100 may include a waterproofing unit (not shown) for preventing an introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal may include a display unit 151, first and second audio output modules 152a and 152b, a proximity sensor 141, an illumination sensor 142, an optical output module 154, first and second cameras 121a and 121b, first and second manipulation units 123a and 123b, a microphone 122, an interface unit 160 and the like.

Hereinafter, description will be given of an exemplary mobile terminal 100 that the display unit 151, the first audio output module 152a, the proximity sensor 141, the illumination sensor 142, the optical output module 154, the first camera 121a and the first manipulation unit 123a are disposed on the front surface of the terminal body, the second manipulation unit 123b, the microphone 122 and the interface unit 160 are disposed on a side surface of the terminal body, and the second audio output module 152b and the second camera 121b are disposed on a rear surface of the terminal body, with reference to FIGS. 1B and 1C.

Here, those components may not be limited to the arrangement, but be excluded or arranged on another surface if necessary. For example, the first manipulation unit 123a may not be disposed on the front surface of the terminal body, and the second audio output module 152b may be disposed on the side surface other than the rear surface of the terminal body.

The display unit 151 may output information processed in the mobile terminal 100. For example, the display unit 151 may display execution screen information of an application program driven in the mobile terminal 100, or user interface (UI) or graphic user interface (GUI) information in response to the execution screen information. The display unit 151 may include at least one of a liquid crystal display (LCD), a thin film transistor-liquid crystal display (TFT-LCD), an organic light emitting diode (OLED), a flexible display, a 3-dimensional (3D) display, and an e-ink display.

The display unit 151 may be implemented in two or more in number according to a configured aspect of the mobile terminal 100. For instance, a plurality of the display units 151 may be arranged on one surface to be spaced apart from or integrated with each other, or may be arranged on different surfaces.

The display unit 151 may include a touch sensor which senses a touch onto the display unit so as to receive a control command in a touching manner. When a touch is input to the display unit 151, the touch sensor may be configured to sense this touch and the controller 180 may generate a control command corresponding to the touch. The content which is input in the touching manner may be a text or numerical value, or a menu item which can be indicated or designated in various modes.

The touch sensor may be configured in a form of film having a touch pattern, disposed between the window 151a and a display (not shown) on a rear surface of the window 151a, or a metal wire which is patterned directly on the rear surface of the window 151a. Or, the touch sensor may be integrally formed with the display. For example, the touch sensor may be disposed on a substrate of the display or within the display.

The display unit 151 may form a touch screen together with the touch sensor. Here, the touch screen may serve as the user input unit 123 (see FIG. 1A). Therefore, the touch screen may replace at least some of functions of the first manipulation unit 123a.

The first audio output module 152a may be implemented in the form of a receiver for transferring voice sounds to the user's ear or a loud speaker for outputting various alarm sounds or multimedia reproduction sounds.

The window 151a of the display unit 151 may include a sound hole for emitting sounds generated from the first audio output module 152a. Here, the present disclosure may not be limited to this. It may also be configured such that the sounds are released along an assembly gap between the structural bodies (for example, a gap between the window 151a and the front case 101). In this case, a hole independently formed to output audio sounds may not be seen or hidden in terms of appearance, thereby further simplifying the appearance of the mobile terminal 100.

The optical output module 154 may output light for indicating an event generation. Examples of the event generated in the mobile terminal 100 may include a message reception, a call signal reception, a missed call, an alarm, a schedule notice, an email reception, information reception through an application, and the like. When a user's event checking is sensed, the controller may control the optical output unit 154 to stop the output of the light.

The first camera 121a may process image frames such as still or moving images obtained by the image sensor in a capture mode or a video call mode. The processed image frames may be displayed on the display unit 151 or stored in the memory 170.

The first and second manipulation units 123a and 123b are examples of the user input unit 123, which may be manipulated by a user to input a command for controlling the operation of the mobile terminal 100. The first and second manipulation units 123a and 123b may also be commonly referred to as a manipulating portion, and may employ any method if it is a tactile manner allowing the user to perform manipulation with a tactile feeling such as touch, push, scroll or the like.

The drawings are illustrated on the basis that the first manipulation unit 123a is a touch key, but the present disclosure may not be necessarily limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

On the other hand, as another example of the user input unit 123, a rear input unit (not shown) may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

On the other hand, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be formed to receive the user's voice, other sounds, and the like. The microphone 122 may be provided at a plurality of places, and configured to receive stereo sounds.

The interface unit 160 may serve as a path allowing the mobile terminal 100 with external devices. For example, the interface unit 160 may be at least one of a connection terminal for connecting to another device (for example, an earphone, an external speaker, or the like), a port for near field communication (for example, an Infrared Data Association (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may also be arranged in a matrix configuration. The cameras may be referred to as an 'array camera.' When the second camera 121b is implemented as the array camera, images may be captured in various manners using the plurality of lenses and images with better qualities may be obtained.

A flash 124 may be disposed adjacent to the second camera 121b. When an image of a subject is captured with the camera 121b, the flash 124 may illuminate the subject.

The second audio output module 152b may further be disposed on the terminal body. The second audio output module 152b may implement stereophonic sound functions in conjunction with the first audio output module 152a (refer to FIG. 1A), and may be also used for implementing a speaker phone mode for call communication.

At least one antenna for wireless communication may be disposed on the terminal body. The antenna may be installed in the terminal body or formed on the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

A power supply unit 190 for supplying power to the mobile terminal 100 may be disposed on the terminal body. The power supply unit 190 may include a battery 191 which is mounted in the terminal body or detachably coupled to an outside of the terminal body.

The battery 191 may receive power via a power source cable connected to the interface unit 160. Also, the battery 191 may be (re)chargeable in a wireless manner using a wireless charger. The wireless charging may be implemented by magnetic induction or electromagnetic resonance.

On the other hand, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may be further provided on the mobile terminal 100. As one example of the accessory, a cover or pouch for covering or accommodating at least one surface of the mobile terminal 100 may be provided. The cover or pouch may cooperate with the display unit 151 to extend the function of the mobile terminal 100. Another example of the accessory may be a touch pen for assisting or extending a touch input onto a touch screen.

A wireless communication unit 110 of the mobile terminal 100 receives and transmits a signal, using electromagnetic waves. Accordingly, the wireless communication unit 110 could cause interference in another electronic device. When a user is talking on a mobile terminal, the wireless communication unit 110 is activated and the intensity of the electromagnetic field becomes stronger. Especially, the user talking on the mobile terminal 100 places the mobile terminal 100 near the ear such that, for example, a hearing aid insertedly worn by the user can be greatly influenced by the electromagnetic field of the mobile terminal 100.

To manufacture the mobile terminal in consideration of compatibility with the hearing aid, FCC (Federal Communication Commission) provides HAC (Hearing Aid Compatibility) as grades indicating interference caused in a receiver 152 (or audio output module) of the mobile terminal 100 by the electromagnetic field.

HAC is an item for certification and evaluation of compatibility so as to use a hearing aid and a mobile terminal 100 with non-interacting between the hearing aid and the mobile terminal 100. Accordingly, HAC is used by wireless device manufacturers and examples of the wireless device include a hearing aid, a mobile terminal and the like. A grade of HAC is required to be a standard grade or higher to manufacture and sell a wireless device in the US.

Figure 2:
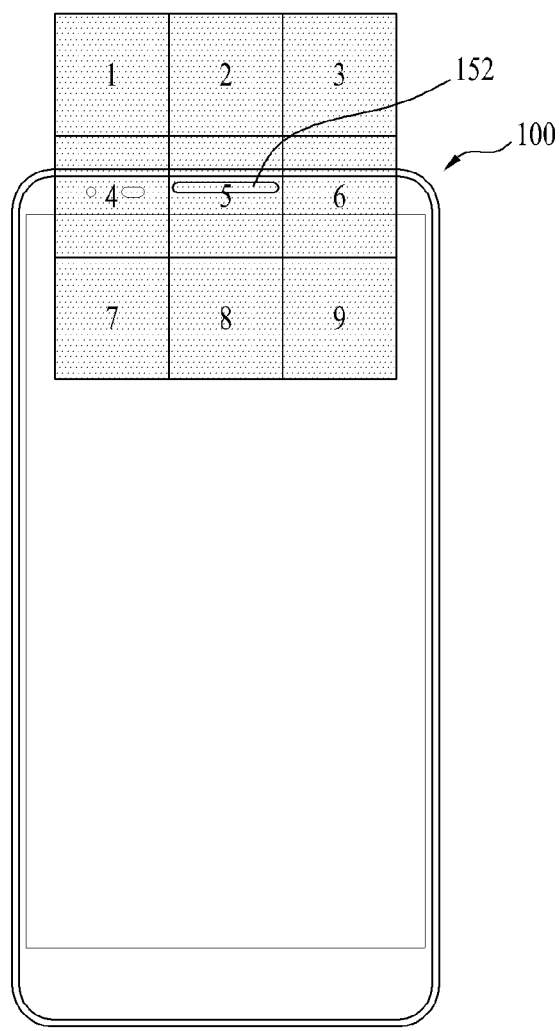
FIG. 2 is a diagram illustrating a method of examining an intensity of an electromagnetic field to set a HAC grade of a mobile terminal in accordance with the present disclosure.

FIG. 2 is a diagram illustrating a method for measuring a HAC grade. A probe for measuring an intensity of an electromagnetic wave while the user is talking on the mobile terminal 100 may measure the intensity of the magnetic field.

A 5 cm×5 cm square area on a space spaced apart 1 cm from the receiver 152 of the mobile terminal 100 is divided into nine sub-areas. A HAC grade is determined based on values measured from the nine sub-areas. More specifically, a peak value for determining the HAC grade is the largest value out of the values measured in the other five sub-areas, except a value measured in a central sub area 5 where the receiver 152 is located and values measured in three sub-areas having the highest intensities.

The HAC grade includes 4 step M grades for radio frequency lesion (M1, M2, M3 and M4, and M4 is the most satisfactory) and T grades for inductive coupling (T1, T2, T3 and T4, T4 is the most satisfactory). Among them, the present disclosure relates to a method for improving M grades.

Figure 3:
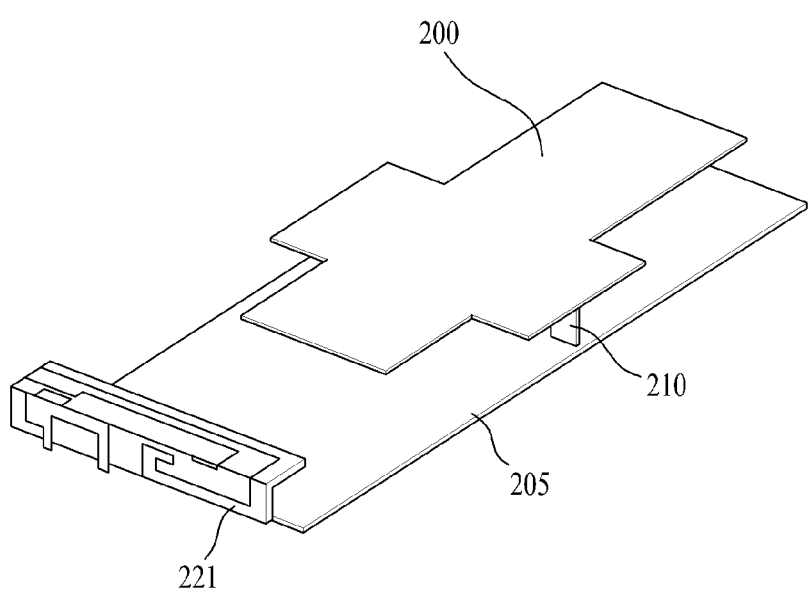
FIG. 3 is a conceptual diagram illustrating an expanded ground of an antenna in accordance with the disclosure.

FIG. 3 is a conceptual diagram illustrating an expanded grounding area of an antenna in accordance with the present disclosure. A device for wireless communication may include at least one of a broadcasting receiving module 111, a mobile communication module 112, a wireless internet module 113, a near range communication module 114, and a location information module 115.

Among them, the module mainly activated when the user uses the mobile terminal, with the receiver 152 directly worn on the ear is the mobile communication module 112. A first antenna 221 for calling may be provided in a lower end portion of the mobile terminal 100 so as to minimize the interference in the receiver 152.

The first antenna 221 for calling may transmit and receive a wireless signal with one or more of a base station, an external device, and a service on a mobile communication network constructed in accordance with GSM (Global System for Mobile communication), CDMA (Code Division Multi Access), WCDMA (Wideband CDMA), HSDPA (High Speed Downlink Packet Access) and LTE (Long Term Evolution). The wireless signal may have various types of data in accordance with transmitting/receiving of a voice call signal, a video call signal or texture/multimedia message.

The first antenna 221 is connected and grounded to a grounding surface 205 of a main board 185 and the electromagnetic wave generated by the driving first antenna 221 is greatly influenced by the size and shape of the grounding surface 205. However, the size of the mobile terminal 100 is limited and the size of the grounding surface 205 located on the main board 185 is limited accordingly. In the present disclosure, a conductive portion 200 is provided in the battery cover 103 to expand the grounding surface 205 such that the mobile terminal of the present disclosure is affective for a small-sized terminal.

Figure 4:
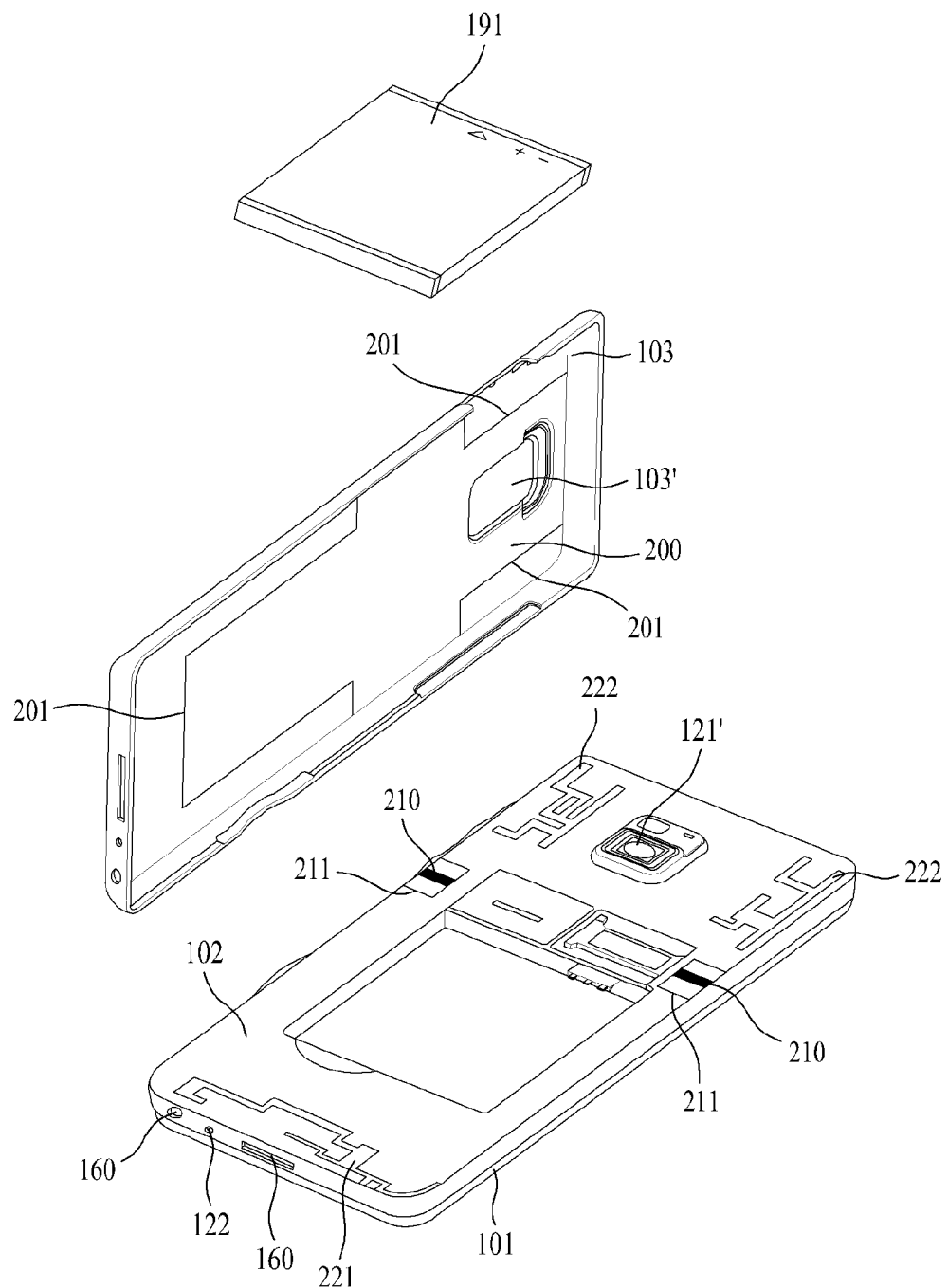
FIG. 4 is a diagram illustrating a state where a battery cover is decoupled from a mobile terminal in accordance with the present disclosure.

FIG. 4 is a diagram illustrating a state where the battery cover 103 is decoupled from the mobile terminal 100. The conductive portion 200 may be partially formed in the battery cover 103, using a conductive material such as a metallic material. The conductive portion 200 may be exposed outside or located in the battery cover 103. Metallic coating or injection molding may be performed in an injection mold.

The shape of the conductive portion 200 has no limitation. If the conductive portion covers the portion of the antenna 221 and 222, the interference to the antenna 221 and 222 could be caused and it is preferred that the conductive portion 200 is formed to avoid the portion of the antenna 221 and 222. As shown in FIG. 4, a lower end portion corresponding to the first antenna 221 arranged in a lower end may be omitted in the conductive portion 200 right and left portions corresponding to a second antenna 222 may be omitted. For example, a cutout 201 may be provided on the conductive portion 200 to correspond to the positions of the antennas 221, 222. The second antenna 222 may be a wireless communication antenna not directly used during the calling and examples of the second antenna 222 may include a GPS antenna, a Bluetooth antenna, a DMB antenna and a wireless RAN antenna.

A contact pin 210 shown in FIG. 3 may be further provided to connect the conductive portion 200 and the grounding surface 205 with each other. As shown in FIG. 4, one end of the contact pin 210 is coupled to the grounding surface 205 through an opening 211 formed through the rear case 102 and the other end thereof is exposed to a rear surface of the rear case 102.

The contact pin 210 and the rear case 102 form the same plate, with being exposed to the rear surface of the rear case 102. For example, a surface on a distal end of the contact pin 210 may be coplanar to the rear surface of the rear case 102. At this time, the surface of the rear case where the contact pin 210 is located may be recessed to accommodate the contact pin 210. For example, the opening 211 may be provided to accommodate the contact pin 210.

The shape of the grounding surface 205 arranged on the main board 185 and the shape of the expanded grounding surface 205 having the conductive portion 200 may be movable in accordance with the position of the contact pin 210. The position of the contact pin 210 may be arranged in the portion where the intensity of the electromagnetic field changes. The portion where a phase changes may be a portion (x) spaced apart ¼ of a communication frequency wavelength used by the first antenna 221 from the position (Y) of the first antenna 221 (see FIG. 5).

Figure 5:
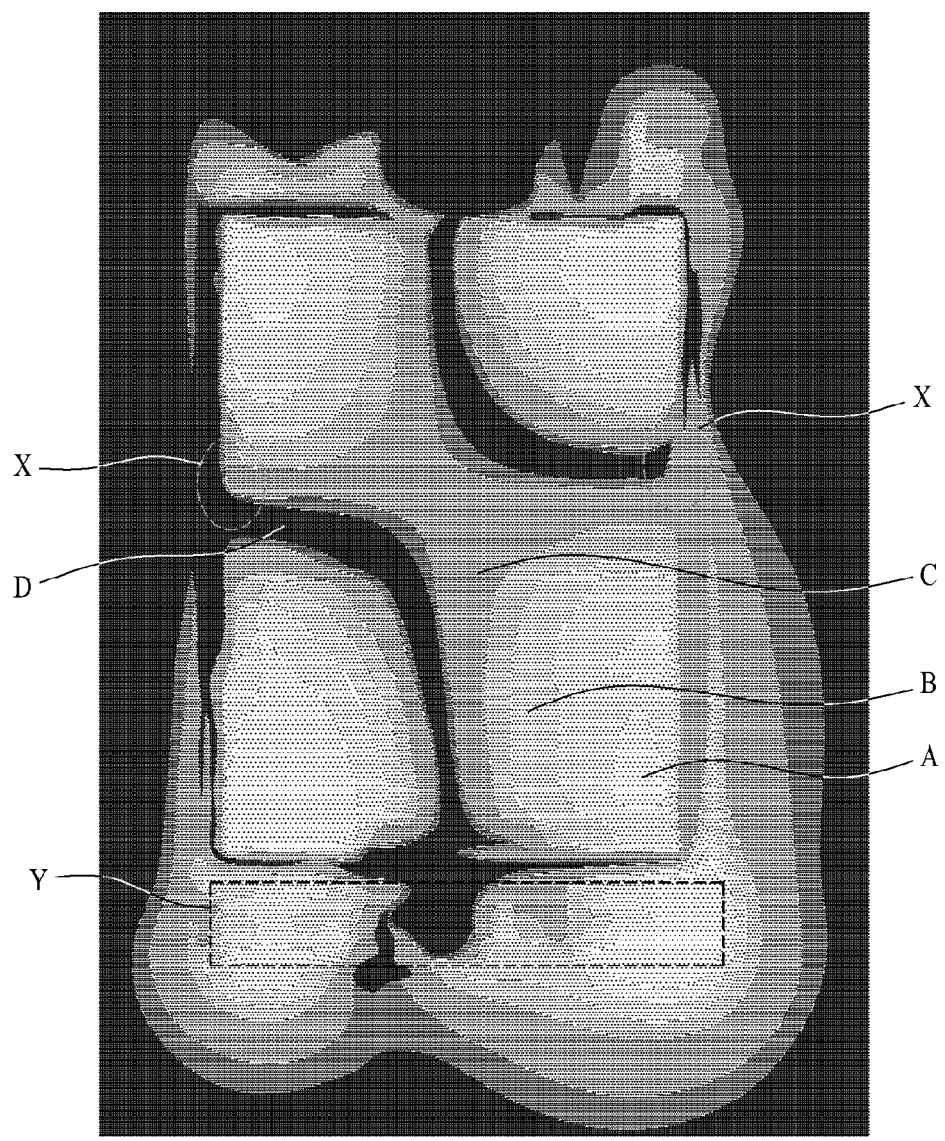
FIG. 5 is a diagram illustrating one embodiment of an electromagnetic field generated in the mobile terminal in accordance with the present disclosure.

FIG. 5 illustrates distribution of the electromagnetic field. In the drawing, "D" is the portion where the intensity of the electromagnetic field is the weakest and "A" is the portion where the intensity of the magnetic field is the strongest.

The portion where the phase of the electromagnetic field changes is the portion where the intensity of the electromagnetic field is the weakest or smallest. Accordingly, it is preferred that the contact pin 210 contacts with a portion (X) corresponding to "D." In the embodiment shown in FIG. 5, the portion having the smallest intensity of the electromagnetic field is right center and left portions of the mobile terminal 100 such that the contact pin 210 may be arranged in a central portion of each right and left end. Considering the position of the contact pin 210, a central portion of the conductive portion 200 may be extended toward each right and left portion.

The shape of the electromagnetic field may be movable by the position of the antenna and the used frequencies. A slit may be formed in the rear case 102 to change the position of the contact pin 210 and the contact pin 210 may be moved along the slit.

Figure 6:
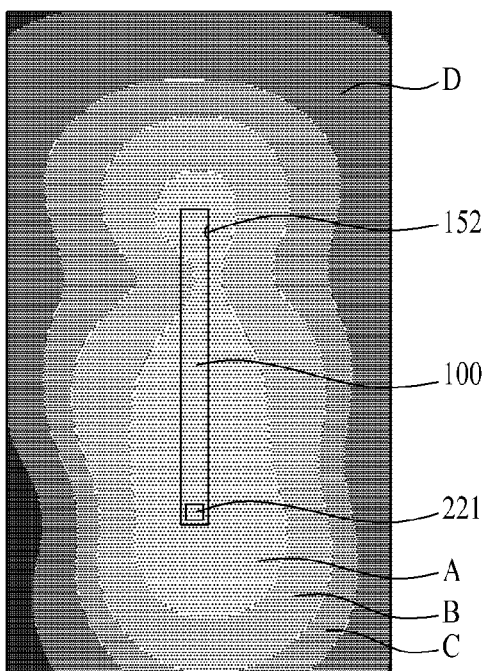
FIGS. 6A and 6B are diagrams illustrating one embodiment of distribution of an electromagnetic field generated in a mobile terminal after and before the battery cover is coupled.
Figure 6:
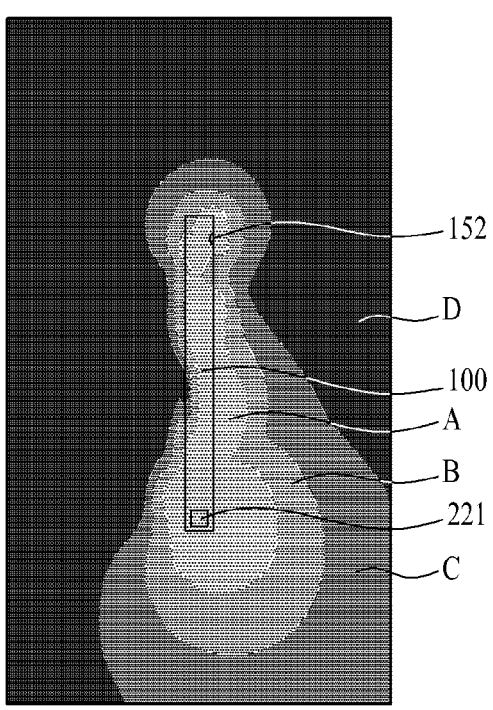
Figure 7:
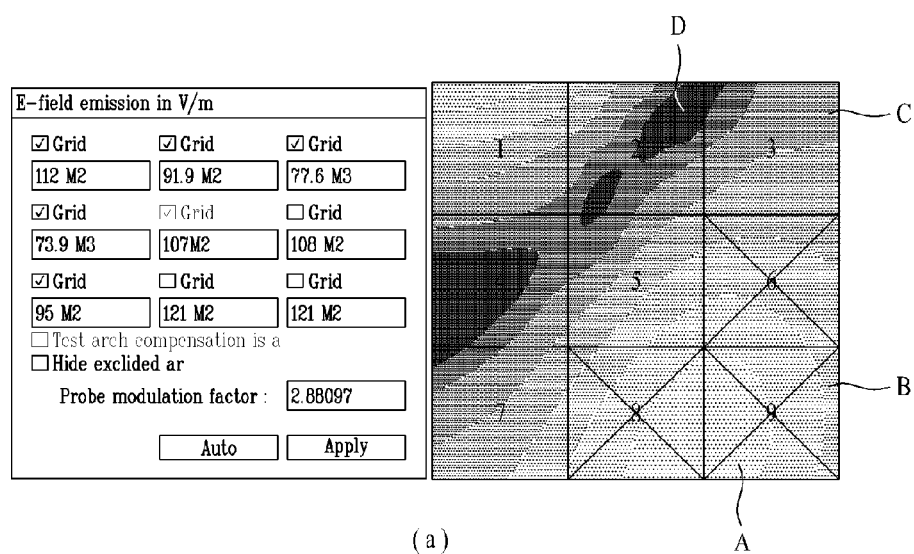
FIGS. 7A and 7B are diagrams illustrating one embodiment of an electromagnetic field generated in a receiver after and before the battery is cover is coupled.
Figure 7:
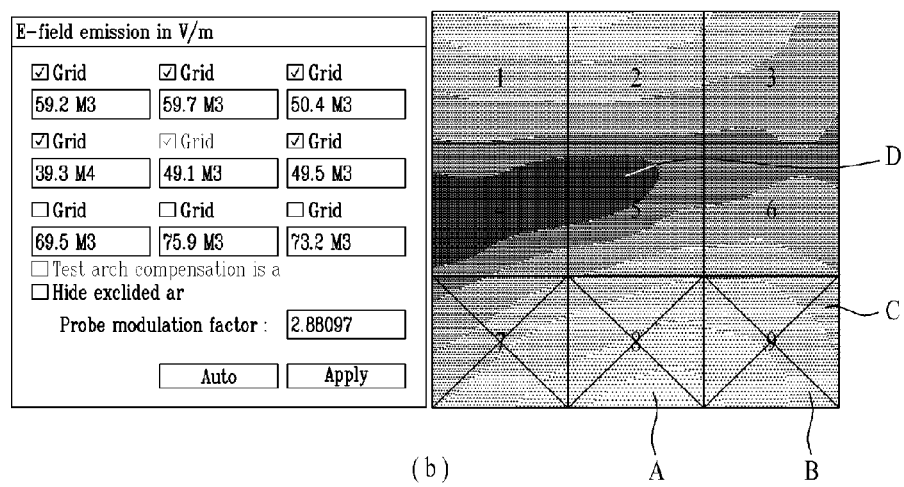

FIGS. 6 and 7 are diagrams illustrating changes of simulated electromagnetic field and changes in HAC grades, using a frequency in 1.8 GHz band in Personal Communication Service (PCS) before and after the conductive portion 200 is connected to the grounding surface 205.

In one embodiment, multiple openings 211 may be provided through the rear case 102. The opening may have a prescribed shape to accommodate movement of the contact pin 210 positioned therein. An exposed surface of the contact pin 210 may be coplanar to a surface of the rear case 102 and may contact the conductive portion 200 when the battery cover 103 is attached to the rear case 102. The opening 211 and contact pin 210 may be provided to have a variety of shapes. For example, the opening 211 may have a rectangular shape and the contact pin 210 may have a thinner rectangular shape so as to be adjustable in the opening 211, the opening 211 may have an oblong shape and the contact pin 210 may have a cylindrical shape, the contact pin 210 may have an I-beam shape to increase a contact area, or another appropriate shape to enable sufficient electrical contact and movement of the contact pin 210. Moreover, a support member may be provided to movably position the contact pin 210 in the opening 211.

Referring to FIG. 6, before the conductive portion 200 is connected to the grounding surface 205, the electromagnetic field is large as shown in (a) and the intensity of the electromagnetic is relatively strong at the portion where the receiver 152 is provided. FIG. 7 (*a*) is a diagram illustrating a state before the conductive portion 200 is connected to the grounding surface 205. Except a central sub-area (5) where the receiver 152 is arranged and three sub-areas (6, 8, and 9) having the strongest intensity, a sub-area (1) having the strongest intensity out of the other areas may have an intensity of 112V/m, which is a value corresponding to M2 grade of HAC lower than a reference value.

However, when the battery cover 103 having the conductive portion 200 in accordance with the present disclosure is provided, the grounding surface 205 may be expanded and the size and intensity of the overall electromagnetic field may be smaller. Referring to FIG. 7 (*b*), the electromagnetic field intensity of one sub-area (2) having the largest intensity, except the central sub-area (5) where the receiver 152 is provided and the three sub-areas (7, 8 and 9) having the strongest intensity may be 59.7V/m. That is a value corresponding to M3 of HAC grades which is higher than the reference value.

As mentioned above, according to at least one of the embodiments in accordance with the present disclosure, the HAC grade may be adjusted to a base grade or higher of the HAC by adjusting the position of the electromagnetic field peak, regardless of the size of the mobile terminal 100. As the ground is expanded, using the battery cover 103, the present disclosure may be applicable to all types of mobile terminals 100 including the battery cover 103.

An object of the present disclosure is to provide a mobile terminal which satisfies HAC grade by expanding a grounding area. To achieve these objects and other advantages and in accordance with the purpose of the disclosure, as embodied and broadly described herein, a mobile terminal may include a mobile terminal including a case; a first antenna mounted in the case to perform wireless communication in a specific frequency band; a grounding surface mounted in the case; a receiver mounted in the case, toward a front surface of the case; a battery cover coupled to a rear surface of the case, the battery cover comprising a conductive portion; and a contact pin configured to connect the conductive portion and the grounding surface with each other, wherein the contact pin is formed in a predetermined portion where a phase of an electromagnetic field formed by the first antenna changes.

A portion of the conductive portion adjacent to the antenna mounted in the case may be omitted. The first antenna may be an antenna configured to transmit and receive a signal for a calling function. The mobile terminal may further include at least one second antenna spaced apart a predetermined distance from the first antenna, wherein a portion of the conductive portion adjacent to the first antenna and the second antenna is omitted. The second antenna may include at least one of GPS, Bluetooth, DMB and wireless RAN antennas.

The position of the contact pin may be movable. The portion where a phase of the electromagnetic field may be ¼ of a wavelength for the first antenna. The battery cover may be coupled to the conductive portion in a double-injection molding method. The contact pin and a surface of the rear case may form the same plane, and the surface of the rear case may include a recessed portion corresponding to the contact pin.

According to at least one embodiment of the present disclosure, the HAC grade may be adjusted to a base grade or higher of the HAC by adjusting the position of the electromagnetic field peak, regardless of the size of the mobile terminal. Furthermore, as the ground is expanded, using the battery cover, the present disclosure may be applicable to all types of mobile terminals including the battery cover 103.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

Although embodiments have been described with reference to a number of illustrative embodiments thereof, it should be understood that numerous other modifications and embodiments can be devised by those skilled in the art that will fall within the spirit and scope of the principles of this disclosure.

More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile terminal comprising:
   a case;
   a first antenna mounted at a lower end portion of the case to perform wireless communication in a prescribed frequency band;
   at least one second antenna corner of upper end portion of the case,
   a grounding surface mounted in the case;
   a receiver mounted in the case, toward a front surface of the case;
   a battery cover coupled to a rear surface of the case, the battery cover including a conductive portion; and
   a contact pin configured to connect the conductive portion and the grounding surface with each other, wherein a center of the conductive portion is extended toward each right and left portion such that the conductive portion has a cross shape, wherein the contact pin is movable and is connected to the extended portion of the conductive portion and the grounding surface where a phase of an electromagnetic field formed by the first antenna changes, and wherein the contact pin is positioned a prescribed distance to the first antenna, and the prescribed distance between the contact pin and the first antenna corresponds to a distance where a magnitude of the electromagnetic field formed by the first antenna is below a prescribed minimum level.

2. The mobile terminal of claim 1, wherein a cutout is formed in a portion of the conductive portion adjacent to the antenna mounted in the case.

3. The mobile terminal of claim 1, wherein the first antenna is an antenna configured to transmit and receive a signal for a calling function.

4. The mobile terminal of claim 3, further comprising:
wherein a cutout is formed in a portion of the conductive portion adjacent to the first antenna and the second antenna.

5. The mobile terminal of claim 4, wherein the cutout on the conductive portion forms the cross shape of the conductive portion.

6. The mobile terminal of claim 1, wherein the second antenna includes at least one of GPS, Bluetooth, DMB or wireless RAN antennas.

7. The mobile terminal of claim 1, wherein a position of the contact pin is movable.

8. The mobile terminal of claim 7, wherein the contact pin moves along a slit formed at the case.

9. The mobile terminal of claim 7, wherein
the contact pin moves according to the position of an activated antenna and wavelength of a signal transmitted through the activated antenna.

10. The mobile terminal of claim 1, wherein the contact pin has a rectangular shape or a cylindrical shape.

11. The mobile terminal of claim 1, wherein the contact pin is positioned where the phase of the electromagnetic field is ¼ of a wavelength for the first antenna.

12. The mobile terminal of claim 1, wherein the battery cover is coupled to the conductive portion by double-injection molding.

13. The mobile terminal of claim 1, wherein the contact pin and a rear surface of the case are coplanar, and
the rear surface of the case includes an opening corresponding to the contact pin.

14. The mobile terminal of claim 1, wherein the grounding surface is a plate substantially parallel to a rear surface of the case, and the conductive portion is a plate parallel to the rear surface of the case.

15. The mobile terminal of claim 1, wherein the receiver is provided near the upper end portion of the case, and the antenna is provided near the lower portion of the case,
wherein the ground surface and the conductive portion extend between the upper end portion and the lower end portion of the case,
wherein the conductive portion is configured to shield the receiver from the electromagnetic field generated by the antenna.

16. The mobile terminal of claim 15, wherein the magnitude of the electromagnetic field near the receiver is reduced based on the prescribed distance of the contact pin from the antenna.

* * * * *